United States Patent Office 3,502,545
Patented Mar. 24, 1970

3,502,545
PROCESS FOR THE SEPARATION OF WATER-SOLUBLE POLYMERIC MATERIALS FROM UNBOUND PROTEIN OR PEPTIDE USING SEMIPOROUS GEL
Thomas L. Westman, St. Louis, and Bernard S. Wildi, Kirkwood, Mo., assignors to Monsanto Company, St. Louis, Mo., a corporation of Delaware
No Drawing. Filed Sept. 27, 1968, Ser. No. 763,384
Int. Cl. C12d 13/06
U.S. Cl. 195—66    16 Claims

ABSTRACT OF THE DISCLOSURE

Preparation of soluble protein-polymer or peptide-polymer products involves reaction of protein or peptide, e.g., an enzyme or hormone, with a water-soluble polymer. Recovery of unbound unreacted protein or peptide from unreacted polymer and soluble polymeric protein- or peptide-containing product presents difficulties. Present invention permits facile separation of unreacted protein or peptide from unreacted polymer, as well as from soluble protein- or peptide-polymer products if present, by chromatography employing a semiporous gel, e.g., cross-linked dextran, column. The unreacted polymer, as well as soluble protein- or peptide-polymer product if present is eluted in the void volume of such column whereas unbound protein or peptide is not, despite the fact that the exclusion limits of the column would not indicate exclusion of unreacted polymer of the molecular weight involved. Fractionation and recovery of protein or peptide can thus be readily effected.

BACKGROUND OF INVENTION

Field of invention

Polymer-protein products; polymer-peptide products; polymer-hormone products; polymer-enzyme products; water-soluble.

Prior art

Water-soluble polymer-protein and polymer-peptide products, for example, water-soluble polymer-hormone and water-soluble polymer-enzyme products, have recently become available. Such water-soluble protein-polymer products are valuable, e.g., the water-soluble polymer-enzyme products can be used for enzymatic processing and the water-soluble polymer-hormone products are utilizable as stable, durable, long-acting forms of the native hormone.

When such products are prepared, the original native protein or peptide material is brought into contact and reacted with the polymeric material. As expected, not all of the original protein or peptide material introduced into the reaction undergoes reaction with the polymer. Accordingly, for economic and technical reasons, it becomes desirable to separate and recover the native protein or peptide from the polymer-protein or polymer-peptide so that the polymer-protein product is obtained free of unbound protein or peptide and that, in addition, the unbound and unreacted protein or peptide is reisolated free of contaminating polymer and recovered for reuse. Because the peptide and protein material is water-soluble, and the polymer and polymer-protein or peptide product is also water-soluble, usual procedures cannot be employed and separation is effected only with great difficulty.

It is apparent that an improved method of separating water-soluble polymers, as well as protein or peptide-polymer products when present, from unbound water-soluble protein or peptide materials would be highly desirable. Such a need is filled by the present invention.

SUMMARY OF INVENTION

The present invention provides a novel process for the separation of water-soluble polymer (hereinafter WSP), as well as water-soluble protein or peptide-polymer products (hereinafter P-P) when present from unbound proteins or peptides (hereinafter P), and subsequent isolation for reuse of protein or peptide. As representative examples of materials which can be separated by the process may be mentioned water-soluble enzyme-polymer products and starting polymer from enzyme employed in production of the polymer-enzyme products, polymer-hormone products and polymer from hormone material employed in production of the hormone-polymer products, and water soluble polymer (WSP) per se from protein or peptides per se.

The process of the invention comprises the step of chromatographing a mixture of unbound protein or peptide (P) from WSP and polymer-protein or peptide product (P-P), if present, on a nonionic semiporous column. It has been found that, operating according to the invention, the P-P elutes from the column in the void volume thereof along with contaminating and unreacted polymer (WSP), whereas the unbound P with which the WSP and P-P is originally mixed elutes at a subsequent time in an "elution" volume. The "void" volume containing the WSP and P-P, if present, and a subsequent elution volume containing the unbound P can accordingly be readily ascertained using standard procedure, as by colorimetric or spectrophotometric methods, a clean separation effected between them, and the fractionated P conveniently recovered for reuse.

In addition, WSP frequently possess electrostatic and other physical characteristics which results in considerable attraction between unbound P molecules and WSP molecules, which presents a separation problem. In such cases, the WSP frequently acts as a binding agent for the P, in the manner of an ion-exchange resin, so that separation by any means is extremely difficult. For these reasons, and others previously given, the present method of separation, which is carried out upon these soluble materials in the form of solutions of the same is highly effective and desirable not only because the materials are in soluble form but also because the separation can be and is effected from solutions of the same.

OBJECTS

The provision of a novel process for the separation of unbound biologically-active P from carboxyl-containing WSP, and from P-P present, employing chromatography on such a nonionic semiporous column, e.g., a cross-linked dextran column, having any or all of the aforementioned advantages, is an object of the present invention. Provision of such a process which is uniquely suited to separation of hormones from WSP and hormone-polymer products and for the separation of unbound enzymes from WSP and polymer-enzyme products, is another object of the invention. Still other objects will become apparent hereinafter and additional objects will be obvious to one skilled in the art.

GENERAL DESCRIPTION OF THE INVENTION

As is well-known in the art, cross-linked dextran gels are commercially available [Sephadex (TM)-Pharmacia Co., Uppsala, Sweden]. These are nonionic semiporous materials and are available with various exclusion limits. In the present case, the exclusion limits are up to about 300,000, usually about 50,000 to about 200,000. Other nonionic semiporous gels are also available, for example, polyacrylamide gels, which also have such exclusion limits, and these may also be employed. Such materials are readily available either in the form of gels themselves or in the form of beads or powder which are readily convertible to gels according to the skill of the art.

As already stated, the process of the invention involves contacting the mixture of unbound P, WSP, and P-P (when present) with such gel material in the form of a column, eluting the WSP and P-P therefrom in the void volume of the column, and eluting the unbound P from the column in subsequent elution volume.

In carrying out the method of the invention, the WSP and P-P product, when present, together with the unbound P, which is usually already in the form of a solution, is placed in concentrated form at the top of the column. If necessary, the pre-existing solution may be concentrated by lyophilization, dialysis, or other suitable physical means. The relatively concentrated unbound P, WSP and P-P mixture is in any event placed at the top of the column, and the previously mentioned concentrated form of the mixture is required only to the extent that concentrated bands of the material are desired by the operator as opposed to relatively diffuse bands which occur in the event the solution of the mixture to be separated is relatively dilute.

The mixture is as usual allowed to pass down through the column. Such passage is facilitated by the employment of water, sucrose solution, or aqueous buffer solution. According to usual practice, the column is ordinarily prepared prior to use in the separation process by washing with water or the solution to be employed in the process. No particular amount of the column packing (i.e., the gel) is required, except for usual practices of the art according to which a sufficient amount of packing of the column is employed to facilitate clean separation, which cannot be effected in any case if insufficient packing is employed. The pH of the buffer solution employed for assisting passage of the mixture or components thereof through the column (which will hereinafter sometimes be referred to as the "eluting solution" or "eluant," the process also being referred to as "elution," and the material which is removed at the bottom of the column being also referred to according to standard practice as the "eluate"), is according to standard practice adjusted so as to be compatible with solubility of the products being separated and stability of the same. Obviously, if separation of the components can be effected by adjustment of pH to render one or the other insoluble without contamination by the other, such would be a preferred method of operation and is not accomplished by the present invention as will be readily understood by one skilled in the art. Since all of the materials in the mixture separated are water-soluble, this presupposes a pH and other conditions under which the same is true. The pH of the solution or buffer solution employed is ordinarily between about 5 and 9, usually between about 6 and 8, but adjustment should obviously be made to ensure stability and retention of activity,, where important, in particular cases, as will be apparent to one skilled in the art.

The products of the separation are recovered according to conventional procedure in the form of bands or peaks, which first appear in the column and which may be removed from the bottom thereof. As already noted, the WSP and P-P materials come off the column in the void volume thereof, or at least in a peak centered near the void volume of the column, whereas the unbound P comes off in a different band or fraction in a subsequent "elution volume" as such subsequent volume is termed according to the art. In this manner, separation and fractionation are conveniently and efficiently effected, and the individual unbound P components of the mixture may be readily recovered and isolated by usual biochemical techniques such as dialysis and/or lyophilization.

The separation technique of the invention has been shown to be valid in several ways. Chromatographically purified soluble P-P does not migrate upon disc gel electrophoresis whereas the P in the presence of polymer do migrate normally. In addition, it has been shown that P and WSP are separated by chromatography under the same conditions of separation, as evident by low optical density of void volume eluates measured at 280 m$\mu$ which demonstrates the absence of P in the void volume eluate. Similarly, biological activity and nitrogen content of void volume eluates are low when a P and WSP, e.g., hydrolyzed EMA, mixture is chromatographed on the column. Conversely, the soluble polymer-enzyme and polymer hormone derivatives are separated possess biological activity and the recovered, unbound protein is isolated as an uncontaminated, biologically active material. The present method, therefore, constitutes a process whereby soluble P can be separated effectively from contaminating and unbound WSP and P-P due to their unique physical properties.

When operating according to the method of the invention, P-P is frequently present in the mixture along with P and WSP. This P-P is eluted in the void volume of the column along with the WSP. In cases where the WSP hydrolyzes during reaction with the P, the hydrolyzed WSP has also been found to appear in the void volume eluate from the column. This is a most desirable advantage of the separation. In view of the fact that, because of the size of the protein molecule, a polymer chain having attached thereto only a single protein moiety will exhibit substantial biological activity, separation of unreacted WSP and P-P in a single fraction, although it results in some attenuation of P-P activity. is not considered an undesirable result of the process. Moreover, recovery of the unreacted starting P, that is, the biologically active enzyme or proteinaceous hormone, substantially free from P-P and WSP is a primary objective of the invention for technical and economic reasons, said objective being readily accomplished according to the method of the invention.

Of course, as expected, if the column is sufficiently overloaded, a "tailing" of the polymer and also polymer-protein product if present, out of the void volume of the column can be made to result.

Although large molecules are expected to pass around a column of this type and appear in the void volume of the column, it is indeed surprising that, in the present case, a water-soluble polymer having carboxyl groups, e.g., hydrolized EMA, elutes in the void volume of the column despite the fact that the molecular weight of the polymer is less than that molecular weight which would be expected to be required for appearance of the polymer in the void volume of the column. Therefore, it is clear that the separation process effected according to the method of the present invention is not based solely upon differences in molecular weight between the polymer and the protein, or upon molecular size, but upon some other phenomenon, which as already stated is not presently understood.

Semiporous gel

The semiporous gel employed according to the invention has the characteristic of retarding a part of certain material placed at the top of the column thereof, while permitting other fractions of the material being separated to pass unrestricted therethrough. The material which passes through a column packed with the semiporous gel without retardation in the column actually passes around the lattices or cross-linkages of which the gel is comprised. Such materials as pass around the gel lattices may be recovered from the bottom of the column at the beginning of the elution in what is commonly referred to as the "void" volume of the column. Other materials, the passage of which is retarded within the molecular structure of the gel column, as a consequence of entrapment by means of the lattices and cross-linkages thereof, can of course only enter the interior structure of the column because of their own molecular characteristics, including molecular weight, linearity, and so on. These materials may be eluted from the column at a subsequent point after recovery of the initial "void" volume, and the volume of eluate in which such materials are eluted is commonly referred to as an "elution" volume.

Materials which appear upon elution in the void volume of the column are commonly of an agglomerate or bulky nature with regard to their molecular structure, since such molecules are not able to enter the inner interstices or voids of the gel of which the column is composed. In the present case, using semiporous columns with exclusion limits up to about 300,000 the P-P and WSP are surprisingly eluted separately from native P in the void volume of the column, whereas the native P are recovered in their characteristic elution volumes of the column. This result is not surprising because of the molecular weight of the polymer-protein or polymer-peptide product, which is greater than the exclusion limits of the column and would therefore be expected to appear in the void volume, but rather because the unreacted polymer is not of a molecular size or structure so that it would be expected to be excluded from the column and recovered in the void volume of the column.

The material of which the column is constructed must be nonionic in nature for the process to be effective. It has been found that soluble P-P and WSP are eluted in bands having a peak which is in or centered near the void volume of such columns regardless of the exclusion limits of the column, up to and including exclusion limits of approximately 300,000 molecular weight, usually 50,000–200,000. In the cross-linked dextran scale, this is up to and including Sephadex (TM) G–200. Moreover, it has been discovered that the only controlling factors are exclusion limits as previously set forth and that effective separation is possible provided only that the unbound P, e.g., enzyme or hormone, is not of a molecular weight so large as to be eluted in the void volume of the column, i.e., so large as to be larger than the exclusion limits of the column. Due to the fact that the components being separated comprise on the one hand the P itself and on the other hand the WSP and the P bound to a high molecular weight polymer (viz., the P-P), this is not a significant limitation.

Other cross-linked materials having a void volume similar to that of the nonionic cross-linked dextran already mentioned, exclusion limits being up to about 300,000, are also operative. One example of another operative nonionic cross-linked resin or gel of this type is cross-linked polyacrylamide. Such products are also commercially available.

WATER-SOLUBLE PROTEIN- AND PEPTIDE-POLYMER PRODUCTS AND THEIR PREPARATION

Definitions

"EMA" is a polymer of ethylene and maleic anhydride.

"EMA type" polymer is defined hereinafter.

"EMA-enzyme" or "EMA/enzyme" (or the reverse) is a copolymer of ethylene and maleic anhydride having enzyme covalently bonded thereto. Such products are the same whether the enzyme is reacted directly with an anhydride group of the ethylene-maleic anhydride copolymer or with a carboxyl group of ethylene-maleic anhydride copolymer, whether or not using an intermediate activating mechanism for carboxyl groups of the polymer. Anhydride groups not participating in the reaction by which the product is produced in aqueous medium are present in the product as carboxyl or carboxylate groups. Such non-participating groups may, however, be converted to amide, imide, ester, etc., groups as can be present in EMA-type polymers, as hereinafter defined. When another protein or peptide, e.g., hormone, replaces "enzyme," the meanings are the same with appropriate adjustment in meaning for the non-EMA moiety.

"Water-insoluble" means that the product concerned does not dissolve in water or aqueous solutions, although it may have such characteristics as a high degree of swelling due to water solvation, even to the extent of existence in gel form.

"Water-soluble" means not water-insoluble, and is further defined in that the product concerned dissolves in water or aqueous solutions. As usual, however, this does not mean that the product dissolves completely at all concentrations or at all pHs. On the other hand, these water-soluble products are characterized by being soluble at a variety of concentrations and pHs, and they are generally soluble at pHs of 7 or greater.

In their water-soluble form, the P-P products are characterized by fundamentally the same biological activity, if any, as the parent native P but have all of the advantages which are attendant upon applicability in solution or suspension form together with increased stability and prolonged activity. Because of their polymeric form, even though soluble, the P-P are separable from native P, as well as impurities and coloring matter of an undesirable nature, by normal separation procedures. However, the soluble WSP and P materials are separable only with difficulty; hence the present invention.

P-P products, e.g., polymer-enzyme or polymer-hormone derivatives, can be prepared by reacting the crystalline or crude P or mixture of P with the WSP in solution, resulting in formation of a polymeric product in which the P is covalently bound. When an anhydride or carboxyl is present in the polymer, e.g., an EMA-type polymer, covalent bonding of the P to the WSP may be effected directly through reaction or coupling with an anhydride group or with a carboxyl group using a carboxyl activating agent. The product is the same in both cases. The pH range for the reaction depends upon the P employed and its stability range. It is usually about 5 to 9.5, preferably about 6–8, but adjustment must of course be made for individual cases. Isolation and purification is generally effected according to normal biochemical procedures, and by the more specific procedure which follows. Since covalent bonding of the P to the WSP is desired, the reaction is ordinarily carried out at low temperatures and at relatively neutral pHs, in water or dilute aqueous buffer as solvent.

When carried out in this manner, the results are production of the desired P-P derivative, but degree of activity imparted to the polymeric product in the case of biological P's, e.g., enzymes or hormones, is sometimes lower than desired, possibly due to partial inactivation of the P during the process. Resort may frequently advantageously be had to employment of a mixed solvent system, using a solvent in which the P is at least partially soluble, usually in an amount up to about 50% by volume. Dimethylsulfoxide (DMSO) is especially suitable as solvent together with water or aqueous buffer solution in a mixed solvent system. Using such a mixed solvent system, the desired active P-P is ordinarily obtained in higher yields and conversions to desirably active product, and introduction of desirably high amounts of P activity into the WSP molecule is generally less difficult.

As stated, the WSP selected for such reaction generally contains carboxyl or anhydride linkages, especially where the P, e.g., enzyme or hormone, contains an amino, hydroxyl (including phenolic hydroxyl), or sulfhydryl group not essential for its activity. The WSP is preferably EMA or an EMA-type polymer, but it can be any of those types disclosed for coupling or reaction with a P, e.g., an enzyme, and in any event it is adapted to effect covalent bonding with the P to produce a P-P either directly or indirectly using an activating agent. Inasmuch as the activity of the starting P, e..g., enzyme or hormone, is desired to be retained in the final product, it is of course firstly necessary that bonding of the P to the WSP be through a group which will not result in inactivation of an active site in the P molecule. Among the various reactive groups of P molecules may be mentioned, besides amino and sulfhydryl, also hydroxyl (including phenolic hydroxyl), carboxyl and imidazolyl. Such groups are present in free or unbound form in inactive portions of hormone and enzyme molecules, as in a lysine, cysteine, serine, threonine, histidine, or tyrosine moiety of such a molecule, where the particular moiety in question is not considered essential for activity, whether hormonal, catalytic in nature, or necessary for substrate binding. Therefore, attachment to the WSP molecule is through reaction of the WSP with such group so as to avoid inactivation of the P during attachment. Generally the linkage is an amide, imide, ester, thioester, or disulfide group, such as formed by the carboxyl or anhydride with an amine or hydroxyl group in a non-essential moiety of the P molecule. Amides are conveniently formed by reacting pendant amino groups of the P with carboxylic anhydride groups on the carrier polymer in water, in aqueous buffer media, or in mixed solvents. Amides, imides and esters are readily formed by activating carboxyl groups of the polymer, and reacting them with respective hydroxyl, amine or mercaptan groups on the other reactant. Such activation may be effected using various carbodiimides, carbodiimidazoles, Woodward's or Sheehan's reagent, or the like, to form highly active intermediates capable of reacting with groups in the P under mild conditions, the latter favoring retention of activity. Such activators are used when a polyacid, e.g., polyacrylic acid, polyamic acid, polyglutaric acid, or like polymers are used.

The polymer selected for such reaction can therefore be said to be adapted to couple or react with the P, e.g., the enzyme or hormone, either directly or indirectly through use of an activating agent, as already indicated, and in any event to effect covalent bonding with the P. The attachment procedures given are conducted by techniques adapted to include any requisite protection for the P, e.g., hormone or enzyme, which may include a reversible blocking of the active, e.g., enzymatically active, site or sites, as for example in the case of papain, where mercuripapain or zinc papain may be employed as an intermediate for reaction with the polymer in order to effect greater yields upon attachment, the protecting atoms being removed subsequent to the attachment reaction.

POLYMERIC MOIETY-WATER-SOLUBILITY

In its broadest context, the polymer to which the P is coupled according to one or more aspects of the invention contains carboxyl or anhydride linkages, especially where the P contains an amino, hydroxyl, or sulfhydryl group not essential for activity. Where a P contains a carboxyl group not essential for activity, the polymer can contain hydroxyl or amine groups for reaction herewith. The polymer may be EMA or an EMA-type polymer, or be any of those types previously disclosed for coupling or reaction with an enzyme, and in any event it is adapted to couple or react with the P to effect covalent bonding and production of the P-P product.

Since covalent bonding is desired, it is understood that the carrier polymer is tailored to contain at least one reactive site for each polymer molecule with which the P can react, either directly or indirectly, to produce a covalent bond. According to the instant invention, this reactive site (or sites) is preferably a carboxyl or carboxylic anhydride group.

Among the polymers suitable for the practice of the instant invention, polymeric polyelectrolytes having units of the formula 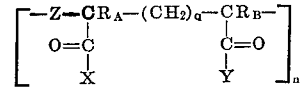 wherein: $R_A$ and $R_B$ are selected from the group consisting of hydrogen, halogen (preferably chlorine), alkyl of 1 to 4 carbon atoms (preferably methyl), cyano, phenyl, or mixtures thereof; provided that not more than one of $R_A$ and $R_B$ is phenyl; Z is a bivalent radical (preferably alkylene, phenylalkylene, lower-alkoxyalkylene, and lower-aliphatic acyloxyalkylene) of 1 to 18 carbon atoms, preferably a bivalent carbon chain of 1–4 carbon atoms, inclusive, which is a part of a unit or group containing 1–18 carbon atoms, $q$ is zero or one, X and Y are selected from OH, —O alkali metal, OR, —OH—$NH_3$, —OH—$R_3N$, —OH—$R_2NH$, —OH—$RNH_2$, —NRR′, $$—(Q)_p—W—(NR'R')_x$$

and $—(Q)_p—W—(OH)_x$, wherein $x$ is 1 to 4 and $p$ is zero or one, wherein R is selected from the group consisting of alkyl, phenylalkyl, or phenyl, in each case of 1 to 18 carbon atoms, wherein R′ is H or R, wherein Q is oxygen or —NR′—, and wherein W is a bivalent radical preferably selected from lower-alkylene, phenyl, phenylalkyl, phenylalkylphenyl, and alkylphenylalkyl having up to 20 carbon atoms, X and Y taken together can be an oxygen atom, and at least one of X and Y being hydroxyl or X and Y together constituting an oxygen atom, are preferred. Many of these polymers are commercially available and others are simple derivatives of commercially available products, which can be readily prepared either prior to or simultaneously with the P coupling reaction, produced as a minor modification of the basic polymer after coupling. Such polymers containing the above-described EMA-type units are hereinafter referred to as an "EMA-type polymer."

Since P molecules, e.g., enzyme or hormone molecules, may have an extremely high molecular weight, even if the polymeric units exemplified as useable for attachment of the P occurs only once in a polymer chain, for example, once in every several hundred units, reaction of the P with this unit will result in a P-P having substantial activity e.g., enzymatic or hormonal activity, and one wherein the P moiety constitutes a substantial portion of the molecular weight of the P-P. If more than one of the exemplified units is present, multiple attachments can be achieved with increased activity of the product. Preferably the units of the formula given are recurring, $n$ being at least 8. When the units are recurring, the symbols in the various recurring units do not necessarily stand for the same thing in all of the recurring units. Moreover, where the units are recurring, some of the X and Y groups may have meanings besides hydroxy or oxygen. For example, some, but not all, of them may be present in the form of imide groups, that is, groups in which X and Y together are —NR— or $—N—W—(NR'R')_x$ wherein R, W and R′ have the values previously assigned.

A preferred type of polymeric material useful in the practice of the invention is the polymer of an olefinically unsaturated polycarboxylic acid or derivative with itself or in approximately equimolar proportions with at least one other monomer copolymerizable therewith. The polycarboxylic acid derivative can be of the non-vicinal type, including acrylic acid, acrylic anhydride, methacrylic acid, crotonic acid or their respective derivatives, including partial salts, amides and esters or of the vicinal type, including maleic, itaconic, citraconic, α,α-dimethyl maleic, α-butyl maleic, α-phenyl maleic, fumaric, aconitic, α-chloromaleic, α-bromomaleic, α-cyanomaleic acids including their partial salts, amides and esters. Anhydrides of any of the foregoing acids are advantageously employed.

Co-monomers suitable for use with the above functional monomers include α-olefins such as ethylene, propylene, isobutylene, 1- or 2-butene, 1-hexene, 1-octene, 1-decene, 1-dodecene, 1-octadecene, and other vinyl monomers such as styrene, α-methyl styrene, vinyl toluene, vinyl acetate, vinyl amine, vinyl chloride, vinyl formate, vinyl propionate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said polybasic acid derivatives may be copolymerized with any of the other monomers described above, and any other monomer which forms a copolymer with dibasic acid derivatives. The polybasic acid derivatives can be copolymers with a plurality of co-monomers. The preferred starting polymer is an approximately 1:1 copolymer of ethylene and maleic acid.

Thus, P-P are produced by reacting the P with a WSP. The resulting P-P is frequently in part insoluble because of interaction between the P moiety and additional polymer chains. However, solubles production can be favored by adhering to certain practices.

General procedure for solubles preparation

In order to achieve high yields of water-soluble P-P, it is desirable to avoid crosslinking which results in insolubilization.

To prepare soluble P-P, therefore, the reaction is preferably performed under substantially non-crosslinking conditions. The undesired crosslinking can be reduced by performing the attachment reaction in high dilution such that fewer reactions occur between several WSP molecules and a single P molecule. Alternatively, high ratios of P to WSP favor reaction of several P molecules with a single polymer molecule. This, therefore, results in an agglomerated P-P system which maintains the desired soluble properties of the individual P molecules. An additional way in which solubles formation is favored is by conducting the reaction at high ionic strength to decrease aggregation of the native P. While such procedures as described above are often desirable, it is not always necessary to use dilute solutions or high P/WSP ratios to cause formation of soluble P-P derivatives.

DESCRIPTION OF THE PREFERRED EMBODIMENTS

The following preparations and examples are given by way of illustration only, and are not to be construed as limiting.

Preparations

The general procedure employed for preparation of P-P consisted of allowing cold solutions of P in appropriate buffers to react overnight at 4° C. with cold, homogenized polymer, e.g., EMA, suspensions. EMA–21, which had a molecular weight of ca. 20–30,000, was frequently employed. Other molecular weight polymers may also be used. For example, EMA 31, having a molecular weight of ca. 60–80,000 may also be employed. The molecular weight of the polymers should be about 10,000 to about 80,000.

Separation of soluble and insoluble adducts, after reaction, was achieved by centrifugation in the cold (Sorval SS–3 (TM) centrifuge, ca. 10,000 r.p.m. and 10 min. centrifugation time). The soluble adducts were generally exhaustively dialyzed against water in the cold and then lyophilized.

Reaction of the WSP with a plurality of P can obviously be carried out stepwise, one P at a time, with or without intermediate isolation, or with all P at once. The latter procedure is preferred for reasons of time, convenience, and economy.

The following constitutes a list of representative utilizable polymer-enzyme products, in water-soluble form, prepared in accord with the preceding general procedure and having at least a substantial percentage of the enzymatic activity present in the native enzyme, together with increased stability, longer duration of activity, and recoverability for use and recycling:

EMA - trypsin (SEMAT), chymotrypsin - EMA (SEMAC), lipase-EMA, cellulase-Ema, *B. subtilis* neutral and alkaline protease-EMA, *B. subtilis* neutral and alkaline protease and lipase-EMA, oxynitrilace-EMA, asparapinase-EMA, pepsin-EMA, EMA-papain and zinc papain, lipase-styrene/maleic anhydride copolymers, cellulase/neutral and alkaline protease-vinyl methyl ether/maleic anhydride copolmers, cellulase-vinyl acetate/maleic anhydride copolymers, cellulase/lipase/alkaline protease-divinyl ether/maleic anhydride cyclocopolymers, chymotrypsin-polymaleic anhydride polymers, trypsin-polymaleic anhydride polymers, alkaline and neutral protease-polymaleic anhydride polymers, acid, alkaline, and neutral protease-polymaleic anhydride polymers and EMA polymers, alkaline protease-polyacrylic anhydride polymers, *B. subtilis* neutral and alkaline proteases and amylase-EMA, EMA-dextranase, EMA-dextranase/neutral protease, and EMA-acid protease (*A. oryzae*).

The polymer-enzyme product may thus be, for example only, a water-soluble product wherein the WSP is selected from the group consisting of ethylene/maleic anhydride copolymer, styrene/maleic anhydride copolymer, vinyl methyl ether/maleic anhydride copolymer, vinylacetate/maleic anhydride copolymer, divinyl ether/maleic anhydride cyclocopolymer, polymaleic anhydride, and polyacrylic anhydride, including cationic and nonionic derivatives thereof, and wherein the enzyme moiety comprises at least one enzyme selected from the group consisting of neutral protease, acid protease, alkaline protease, trypsin, chymotrypsin, lipase, cellulase, oxynitrilase, asparaginase, pepsin, dextranase, amylase and papain.

Proteinaceous or peptidic hormones which form active water-soluble adducts with EMA and other WSP such as those mentioned in the foregoing in the manner of the following examples include:

Bovine growth hormone (BGH)
Insulin
ACTH
Vasopressin
Glucagon (anti-insulinogenic—mobilizes glycogen, increases blood sugar)
Thyroxine (amino acid hormone—affects basal metabolism)
Thyroid stimulating hormone (TSH)
Lactogenic hormone (prolactin)
Luteinizing hormone (LH)
Follicle-stimulating hormone (FSH)
Melanocyte stimulating hormone (MSH)
Oxytocin (stimulates milk ejection)
Secretin (affects digestive enzyme secretion)
Bradykinen (muscle contractor)
Angiotensin (pressor action hormone)
Lipotropic hormone (fat mobilizer)

The various hormones and enzymes (P) mentioned may be separated from the various polymers (WSP) mentioned, and from the various polymer-protein or polymer-peptide (P-P) products mentioned, according to the present invention, the P and WSP being the starting materials from which the various P-P are formed. In aqueous solution, unreacted polymer having an anhydride group converts to a carboxyl-containing polymer by which term is encompassed also a carboxylate containing polymer, since the exact form of the carboxyl group depends only upon pH, which carboxyl-containing polymer is required for the separation of the present invention.

The following examples are given by way of illustration only and are not to be construed as limiting.

EXAMPLE 1

Soluble EMA-trypsin(SEMAT); fractionations

Trypsin (Worthington Biochemical Co.) was stored in the cold and was used as received. EMA–21 was converted completely to the anhydride by heating at 105° C. in vacuo to constant weight (ca. 15 hrs.) and then stored in sealed containers until used. BAEE (benzoylarginine ethyl ester) was obtained from Mann Laboratories and used as received.

SEMAT.—In a typical experiment 500 mg. trypsin was dissolved in 15 ml. of cold 0.2 M phosphate buffer, pH 7.5 and 1.00 g. of EMA was homogenized in a Waring Blendor for ca. 1 minute with 100 ml. cold phosphate buffer, pH 7.5. The solutions were combined and the mixture was stirred in a cold room (4° C.) for 12–15 hours.

The mixture was then centrifuged in the cold for 10 minutes at ca. 10,000 r.p.m. in a Sorvall SS–1 centrifuge.

The supernatant was separated from the sedimented, crosslinked Trypsin-EMA adduct (IMET) and the supernatant was exhaustively dialyzed against deionized water at 4° C., to remove phosphate ion. Lyophilization of the dialyzed material yielded the crude product. The ratio of soluble to insoluble adduct and the protein content of the adduct varies with the ratio of trypsin to EMA employed in the preparation.

Fractionation.—(a) For general purification ca. 100 mg. of crude SEMAT was dissolved in a minimum amount of 10% sucrose/0.2 M phosphate of buffer pH 7.5 and placed on a column (ca. 5 x 40 cm.) of Sephadex G–100 (TM-crosslinked dextran; exclusion limits ca. 100,000) equilibrated with phosphate buffer, pH 7.5. Elution was followed in the usual manner and fractions were collected. The void volume eluate was collected, dialyzed and lyophilized to yield product SEMAT. The hydrolyzed unreacted EMA–21 (HEMA) was also recovered in the void volume eluate. Unreacted trypsin is present and recovered from later elution volumes or fractions taken from the column. The recovered trypsin possesses 60–90% of the activity of the starting native trypsin.

(b) The integrity of the SEMAT was shown by chromatography of physical mixtures of trypsin and HEMA (hydrolyzed EMA) which gave a void volume fraction containing HEMA which had very low protein content as shown by UV absorption at 280 m$\mu$ vs. 215 m$\mu$ and low nitrogen content (less than 0.2%). Disc gel electrophoresis toward both positive and negative poles did not give any migrating and stainable bands with purified SEMAT, whereas a mixture of trypsin and HEMA gave a band with $R_f$ approximately identical with native trypsin. SEMAT gave a stain (Amido Schwarz dye) when added to the lower gel which was then polymerized and stained.

The same result is obtained on fractionation when using soluble polymaleic anhydride-trypsin, trypsin, and hydrolyzed polymaleic anhydride (HPMA) as starting mixture for the fractionation.

EXAMPLE 2

Soluble chymotrypsin-EMA (SEMAC); fractionation

To 240 ml. of cold 0.2 M phosphate buffer pH 7.3, was added 1.050 g. of EMA–21 and the mixture was homogenized for one minute. During this time, 210 mg. of chymotrypsin (crystalline) was dissolved in 60 ml. cold, distilled water. The two solutions were combined and magnetically stirred overnight in a cold room. The mixture was then centrifuged to separate soluble and insoluble systems and the two were then lyophilized overnight. The lyophilized soluble and insoluble systems were exhaustively dialyzed against cold water and dialyzed. Weight soluble chymotrypsin/EMA (SEMAC), 1,441.82 mg. Weight insoluble chymotrypsin/EMA (IEMAC), 792.11 mg.

Fractionation.—Using the procedure described in Example 1, 100 mg. of crude SEMAC was chromatographed on a Sephadex (TM) G–100 column, equilibrated with 0.2 M phosphate buffer, pH 7.5. Elution gives a peak centered near the void volume. The peak eluate was collected, dialyzed against cold water and lyophilized. Weight of fraction: 17.60 mg. The fraction contained soluble EMA-chymotrypsin and HEMA. Unreacted chymotrypsin of 60–90% the original activity is eluted in a later fraction or elution volume.

Assay of chymotrypsin and SEMAC with ATEE
(N-acetyl-L-tyrosine ethyl ester)

To ATEE activities of chymotrypsin and SEMAC were determined using 0.1 M phosphate buffer, pH 7.4. For assay 100 gamma ATEE (25 mg. in 1.25 ml. distilled acetonitrile) was added to 3 ml. of phosphate buffer. At zero time, 100 gamma of chymotrypsin solution (0.398 mg. chymotrypsin in 1 ml. phosphate buffer) or 100 gamma of SEMAC solution (12.750 mg. SEMAC in 1 ml. phosphate buffer) was added and the change in optical density at 237 m$\mu$ as a function of time was recorded on a Cary Model 14 spectrophotometer. Chymotrypsin activity: 0.186 unit/sec./100 gamma; SEMAC activity: 0.422 unit/sec./100 gamma. (Units are arbitrary and are based upon change in optical density per unit time.)

The same result is obtained on fractionation when using soluble polyacrylic anhydride-chymotrypsin, chymotrypsin, and hydrolyzed polyacrylic anhydride (HPAA) as starting mixture for the fractionation.

EXAMPLE 3

Soluble EMA–BGH and other hormones; fractionation (A) Preparation of BGH–EMA Adducts.—The general procedure employed consisted of suspending the EMA in 50–100 ml. of cold 0.2 M phosphate buffer, pH 7.5, homogenizing in a Waring Blendor for 1 minute and then adding a BGH solution, prepared by dissolving BGH in ca. 50 ml. of cold phosphate buffer. The solution was then stirred ca. 18 hrs., at 4° C. The insoluble fractions were collected by centrifugation and then washed 5 times with 30 ml. portions of cold 0.1 M NaCl and 6 times with cold deionized water and then lyophilized. The soluble fractions (supernatant) were dialyzed against 30–60 liters of deionized water at 4° C., and then lyophilized.

Purification of BGH–EMA insoluble fractions

An appropriate quantity (25–50 mg.) of the above BGH–EMA insoluble fractions was placed in a chromatography column and, at 4° C., the material was washed consecutively with 1 liter of 0.01 M HCl, 0.01 M NaOH and with 3 M urea, 2 M guanidine hydrochloride or deionized water. The flow rate was such that the washing period required 3–5 days. Two such samples were active in the tibia growth assay.

Fractionation of hormone-EMA–21 and EMA–31 soluble fractions

Sephadex G–100 (TM-crosslinked dextran) powder (exclusion limits ca. 100,000) was equilibrated with appropriate buffer solutions (2 M HOAc, pH 2, 0.2 M phosphate, pH 7.5 and glycine-NaOH, pH 9.5) and then packed into columns. Preparative columns were ca. 1 m. x 3 cm. and analytical columns measured ca. 45 cm. x 1–2 cm. The hormone-EMA adduct (0.5–2.0 mg.) was placed on the analytical columns using 0.1 ml. of 50% sucrose or buffer. Preparative column loadings were ca. 50–100 mg. of adduct in 1.0 ml. of 50% sucrose. Appropriate fractions were collected and elution was followed by measurement of optical density at either 215 m$\mu$ or 280 m$\mu$ or both when allowable. HEMA (hydrolyzed EMA–21) was eluted in the void volume at pH 7.5 and 9.5 along with BGH-polymer product, while free BGH was eluted in a subsequent elution fraction (E–BGH).

This experiment shows that unreacted hormone can be separated from polymer-hormone product and unreacted polymer.

Chromatography of three separate soluble BGH–EMA adducts over Sephadex G–100, as in the foregoing, showed the presence of unbound BGH in elution volumes. Collection of void volume fractions and rechromatography of such fractions indicated the absence of free BGH. Disc gel electrophoresis gave no stainable bands. The free BGH was therefore entirely absent from this void volume material, which comprised only BGH–EMA and HEMA.

(B) Preparation of insulin/EMA–21, ACTH/EMA–21, and Vasopressin/EMA–21 adducts.—The same general procedure was employed as with BGH–EMA adducts (vide supra), except that only small amounts of insoluble fractions were obtained, apparently due to less crosslinking.

Insulin/EMA-21, ACTH/EMA-21, Vasopressin/ EMA-21, fractionations.—Chromatography of these several preparations on Sephadex G-100 gave comparable separations of unbound hormone (as in A). Rechromatography of void volume fractions indicated little or no unbound hormone to be present in the void volume, but rather to be present in subsequent elution volumes. HEMA appeared with P-P in the void volume fractions.

EXAMPLE 4

Polyacrylamide gel chromatographic fractionation of soluble trypsin/EMA (SEMAT), HEMA, and trypsin A chromatography column is prepared by equilibrating with 0.1 M phosphate buffer, pH 7.5, a crosslinked polyacrylamide gel (Bio-Gel P-300 (TM), exclusion limit 300,000 molecular weight; Bio-Rad Laboratories; Richmond, Calif.). Crude soluble trypsin/EMA-21 and -31 products (100 mg.) (prepared as described above) are dissolved in 0.1 M KCl, placed on the column, and the column is eluted using 0.1 M phosphate buffer, pH 7.5. The elution is followed by measuring optical density at 280 m$\mu$ or 215 m$\mu$ of the eluant fractions. The void volume fractions are collected, dialyzed, and lyophilized to yield a soluble solid trypsin/EMA product and unreacted HEMA which, by disc gel electrophoresis, is devoid of unbound trypsin. The enzymatic activity of this trypsin/EMA product is 25% of that of native trypsin as measured by the rate of hydrolysis of BAFE.

Unbound trypsin is obtained as a later-eluting material from the column, the elution volume of which corresponds to that of native trypsin (as determined on the same column in a separate experiment) and the disc gel electrophoresis pattern of which is identical to that of native trypsin, free of HEMA by elemental analysis. The enzymatic activity of this trypsin material is 65-90% that of native trypsin as measured by BAEE hydrolysis.

The same fractionation result is obtained when using soluble styrene/maleic anhydride-trypsin, trypsin, and hydrolyzed styrene/maleic anhydride (HSMA) as the starting mixture for the fractionation.

EXAMPLE 5

Insulin/EMA—fractionation on crosslinked dextran of insulin, HEMA, and insulin/EMA Insulin/EMA-21 and -31 products were prepared by allowing 106.11 mg. insulin in 15 ml. cold 0.2 M phosphate buffer, pH 7.5, to stir overnight at 4° C. with a mixture of EMA (307.3 mg.) which had been homogenized for one minute with 30 ml. of cold phosphate buffer, and which was transferred with an additional 15 ml. of cold phosphate buffer. The insoluble materials were separated from the supernatant by centrifugation and washed with 0.1 M NaCl and water and finally lyophilized to yield the insoluble insulin/EMA product. Dialysis and lyophilization of the supernatant yielded the soluble insulin-EMA product.

55.89 mg. insulin/EMA-21 was dissolved in 0.4 ml. of 50% sucrose and placed on a column of Sephadex G-75 (TM-crosslinked dextran; exclusion limits ca. 50,000) equilibrated with 0.2 M phosphate, pH 7.4 (void volume=136 ml.). Elution utilized 0.2 M phosphate buffer, pH 7.4.

Fractions were collected and those eluates at or near the void volume (21 ml., total) were dialyzed and then lyophilized to yield a total of 5.59 mg. of insulin/EMA-21 and HEMA. Insulin/EMA-31 on Sephadex G-100 gave comparable results.

Bioassay on the insulin/EMA-21 was determined by observing the decrease in glucose blood plasma levels as a function of time in rabbits. One and one-half hours after intravenous injection there was observed a 50% original level in glucose, after four hours 60% of the original level in glucose, and after six and one-half hours a 75% original level in glucose. (Injection levels were based upon an assumed 1% nitrogen content of the soluble insulin/EMA-21 product.)

Unbound insulin is eluted in a subsequent elution fraction (or volume) and possesses biological activity comparable to that of native insulin. Insulin/EMA-31 gave comparable results.

EXAMPLE 6

Other Fractionations

Numerous other biologically-active P, both hormones and enzymes, are separated from the various polymers with which reacted to prepare P-P, as disclosed just preceding the examples, if these polymers contain carboxyl groups, or from their hydrolysis products which do contain carboxyl groups (since the P-P formation is conducted in aqueous solution) and from the biologically-active P-P products themselves, according to the process of the present invention, by following the procedure of the preceding examples.

In addition to application in separation of P from unreacted WSP and P-P products, the invention finds application in areas of enzymatic processing which employ an enzyme for digestion of a substrate in the presence of a carzoxyl-containing WSP or a polymer which converts to a carboxyl-containing WSP under conditions of the enzymatic processing, in which case the separation process of the invention may be employed to separate residual unbound enzyme from carboxyl-containing WSP at the end of the digestion process.

We claim:
1. Process for the separation on a chromatographic column of unbound, biologically-active, water-soluble protein or peptide having a molecular weight not excluded by the column limits from water-soluble carboxyl-containing polymer having a molecular weight of about 10,000 to about 80,000, which comprises the step of chromatographing a mixture thereof by passing the same over a nonionic crosslinked semi-porous gel column having exclusion limits which are (1) greater than the molecular weight of the water-soluble carboxyl-containing polymer and (2) greater than the molecular weight of the biologically active, unbound, water-soluble protein or peptide, and (3) up to about 300,000, recovering water-soluble carboxyl-containing polymer in the void volume of the column, and recovering biologically-active, unbound, water-soluble protein or peptide in a subsequent elution volume of the column.

2. Process of claim 1, wherein a water-soluble polymer-protein or peptide product, having the biologically-active protein or peptide covalently bound therein, is also present in the mixture to be separated and wherein polymer-protein or peptide product is also recovered in the void volume of the column.

3. Process of claim 1, wherein the materials separated are HEMA and trypsin.

4. Process of claim 1, wherein the materials separated are HEMA and BGH.

5. Process of claim 2, wherein the materials separated are proteinaceous or peptidic hormone, polymer-proteinaceous or peptidic hormone product, and polymer.

6. Process of claim 2, wherein the materials separated are polymer, enzyme, and polymer-enzyme product.

7. Process of claim 2, wherein the materials separated are polymer, bovine growth hormone (BGH), and polymer-BGH product.

8. Process of claim 7, wherein the polymer-BGH product is EMA-BGH and the polymer is HEMA.

9. Process of claim 2, wherein the materials separated are trypsin, polymer-trypsin product, and polymer.

10. Process of claim 9, wherein the polymer-trypsin product is EMA-trypsin and the polymer is HEMA.

11. Process of claim 2, wherein the materials separated are chymotrypsin, chymotrypsin-polymer product, and polymer.

12. Process of claim 11, wherein the chymotrypsin-polymer product is chymotrypsin-EMA and the polymer is HEMA.

13. Process of claim 2, wherein the materials separated are insulin, polymer-insulin product, and polymer.

14. Process of claim 13, wherein the polymer-insulin product is EMA-insulin and the polymer is HEMA.

15. Process of claim 1, wherein the gel column is selected from the group consisting of cross-linked dextran and crosslinked polyacrylamide.

16. Process of claim 2, wherein the polymer-protein product is selected from the group consisting of water-soluble maleic anhydride copolymer-enzyme products, polymaleic anhydride-enzyme products, and polyacrylic anhydride-enzyme products, and wherein the polymer is a carboxyl-containing hydrolysis product of the particular polymer constituting the polymer moiety of the polymer-enzyme product.

References Cited
UNITED STATES PATENTS

| | | | |
|---|---|---|---|
| 3,318,782 | 5/1967 | Garbutt | 195—66 |
| 3,415,804 | 12/1968 | Milnerton | 260—112 |

JAMES L. DECESARE, Primary Examiner

U.S. Cl. X.R.

210—31; 260—112